April 17, 1951 R. E. ZENNER 2,549,038
WINDING AND REELING MECHANISM
Filed Aug. 16, 1946
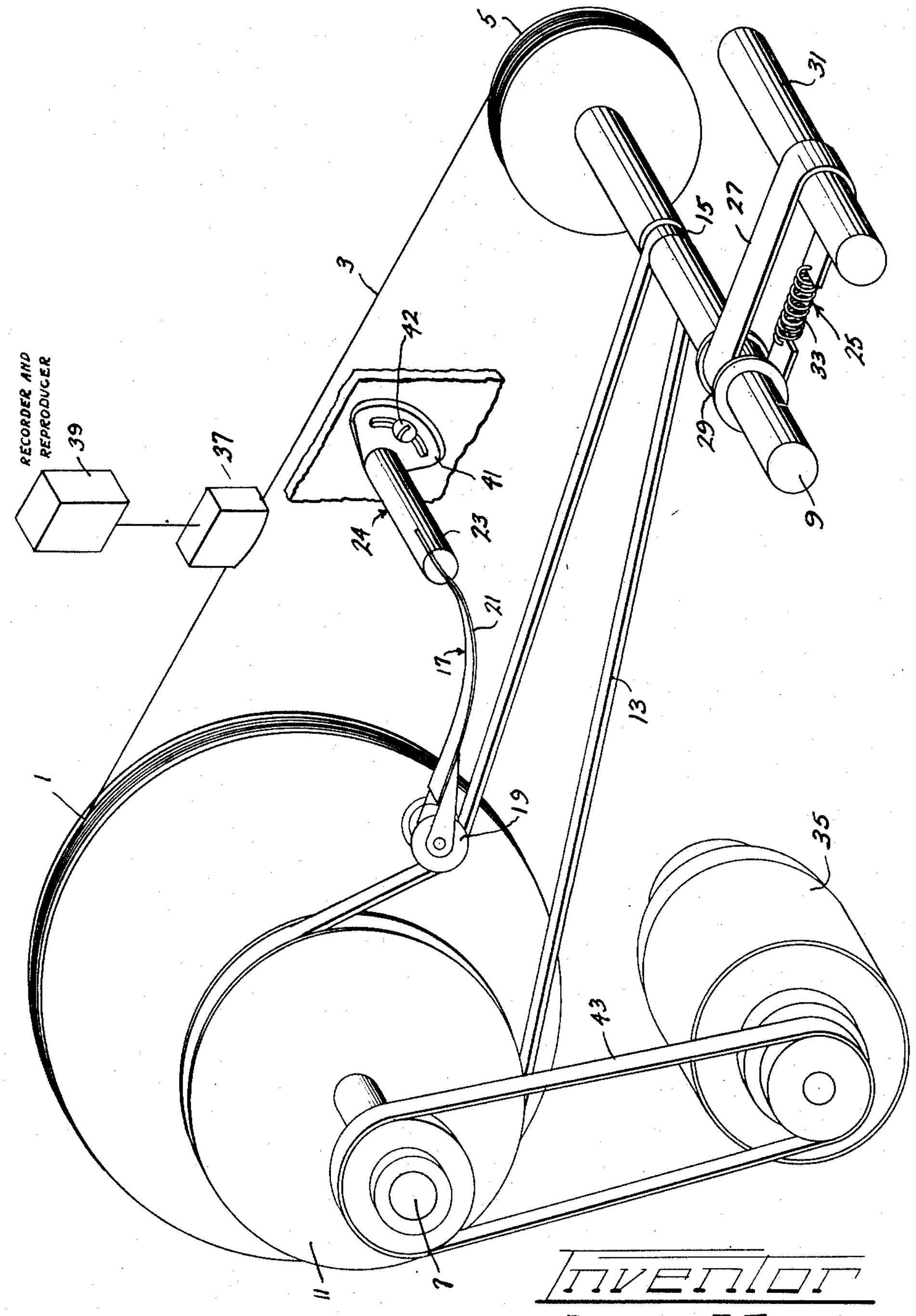
Inventor
RAYMOND E. ZENNER
by The Firm of Charles W. Hills Attys Patented Apr. 17, 1951 2,549,038

UNITED STATES PATENT OFFICE 2,549,038

WINDING AND REELING MECHANISM

Raymond E. Zenner, Brookfield, Ill., assignor to Armour Research Foundation of Illinois Institute of Technology, Chicago, Ill., a corporation of Illinois Application August 16, 1946, Serial No. 690,955

3 Claims. (Cl. 242—54)

My invention relates to winding and reeling mechanisms for transferring a medium from one spool or pulley to another.

In winding and reeling mechanisms it is frequently desirable to transfer a longitudinal medium from one medium supporting device, such as a spool or pulley to another at controllable linear velocity and in a manner avoiding looseness and the consequent possibility of tangling or jerking. In magnetic recorders and reproducers, for example, the magnetizable recording medium should be passed across the recording head at a uniform linear velocity to cause changes in magnetization along the length thereof in strict accordance with the time variations of the intelligence to be recorded. In the reproducing operation the process is reversed and the medium passed across the reproducing head at uniform linear velocity to induce voltages therein having time variation in accordance with the longitudinal variations in magnetization along the medium, thus to reproduce the intelligence placed thereon. It is of course evident that good fidelity can be achieved only if both the recording and reproducing operations are carried out with a high degree of constancy of motion of the medium and that variations such as might be due to slack in the medium be avoided. In addition, it is desirable to provide simple, inexpensive, and highly reliable mechanisms for this purpose so as to minimize the first cost and maintenance expense of magnetic recording and reproducing equipment.

It is further desirable in winding and reeling mechanisms, such as those used in a magnetic recorder and reproducer, to maintain a substantially constant pull on the recording medium during recording or reproducing operations and during the re-wind operation, thus to avoid any tendency to break the recording medium. Furthermore, it is desirable to arrange the mechanism so that the winding spool always tends to take up more medium than is released from the unwinding spool to the end that the latter will not overshoot and thus produce entangling slack when winding is discontinued.

It is an object of my invention to provide an improved winding and reeling mechanism wherein rotation of a single shaft in one direction accomplishes transfer of the medium in one direction and rotation of that shaft in the opposite direction accomplishes transfer in the reverse direction and the medium is maintained taut at all times.

Another object of my invention is to provide a winding and reeling mechanism having a high degree of simplicity in construction and reliability in operation so as to minimize the cost of production and reduce the expenses of operation and maintenance.

Further it is an object of my invention to provide a winding and reeling mechanism having features of construction, combination, and arrangement rendering it suitable for use in magnetic recorders.

The novel features which I believe to be characteristic of my invention are set forth with particularity in the appended claims. My invention itself, however, both as to its organization and method of operation, together with further objects and advantages thereof may best be understood by reference to the following description taken in connection with the accompanying drawing in which the single figure shows a perspective view of an embodiment thereof.

In the drawing, 1 and 5 represent storage spools upon which the medium such as wire, tape, etc. is wound, the medium being designated by 3. Spools 1 and 5 are rigidly mounted on shafts 7 and 9 respectively so that the corresponding shafts and spools have like angular positions. Pulley 11 is attached to the shaft 7 and is adapted to receive belt 13 which passes on its opposite end through notch 15 on shaft 9.

In order to cause the selective transfer of energy from shaft 7 to shaft 9, an idler assembly shown generally at 17 is arranged to coact with belt 13. This assembly includes idler pulley 19 disposed to rotate in accordance with the motion of belt 13 and biasing spring 21 which urges belt 13 to a tightened condition, this spring being attached to member 23 which is adjustably supported by the mechanism shown generally at 24.

Idler assembly 17 is disposed so that when belt 13 rotates in the direction corresponding to unwinding of medium 3 from spool 1, the idler tends to increase the belt tension as compared to the tension existing when belt 13 rotates in the opposite direction. To this end, idler 17 is located so that when medium 3 is being wound on spool 1 an increased component of force is exerted thereon in the direction opposing the normally belt tightening action of spring 21. Thus, in the embodiment shown in the drawing, idler 19 is located to depress the upper portion of belt 13 and spring 21 is arranged to bias the idler in the downward direction. Hence the belt tension pulls the idler in a direction tangential to the surface of pulley 11 (upward and in the direction of shaft 7) on one side and in a direction substantially towards shaft 9 on the other side.

The former effect of the belt tension opposes spring 21 whereas the latter has no effect. Inasmuch as the upper portion of belt 13 is relatively tighter when shaft 7 is rotated in the counterclockwise direction to rotate shaft 9 along with it, the tensioning action of the spring 21 is opposed to a greater degree in this condition and the belt accordingly is looser on the pulley 11 and portion 15 of shaft 9. As is described in further detail hereafter, this effect is supplemented by the action of brake 25.

It is the purpose of the mechanism shown generally at 25 to act as a directional brake for shaft 9 and spool 5. To this end, belt 27 is wound about pulley portion 29 of shaft 9 and stationary member 31, the ends of this belt being connected by spring 33 at the under portion. If desired, the portion of belt 27 passing over member 31 may be anchored, as by glueing, nailing, etc. so that relative motion therebetween is made impossible.

When shaft 9 rotates in the clockwise direction, belt 27 likewise tends to rotate but this tendency is overcome by the force exerted by member 31 against the belt. This results in increased tension in the lower portion of belt 27 and reduced tension in the upper portion, thereby stretching spring 33 and producing a slight retarding torque on shaft 9. When spool 5 is rotated in the counterclockwise direction a similar tendency exists except that the upper portion of belt 27 is subjected to increased tension and the lower portion decreased tension. Inasmuch as belt 27 cannot of itself give, a substantial force is produced along the upper portion thereof, this force being considerably greater than the force obtained when shaft 9 moves clockwise because in that case spring 33 stretches. Inasmuch as the braking torque on shaft 9 associated with the presence of belt 27 is determined by the pressure of the belt as it passes over the shaft, it is evident that the retarding torque produced by the belt is less in the case of clockwise rotation than counterclockwise rotations so that the belt acts as a one-way brake, producing greater retarding torque for one direction than the other.

Mechanical torque for the operation of the winding and reeling system may be applied to shaft 7. When this shaft is turned in the clockwise direction, spool 1 unwinds and spool 5 winds. In this case, belt 13 exerts little force opposing spring 21 so that the full force of this spring is available to tighten belt 13 and cause spool 5 to tend to be driven at an angular velocity determined by the relative diameters of pulley 11 and section 15 of shaft 9. In order to keep medium 3 taut during this operation, the diameter of portion 15 of shaft 9 is made so small relative to the diameter of pulley 11 that spool 5 tends to rotate at a speed causing more of medium 3 to be taken up by spool 5 than is released by rotation of spool 1. Belt 13 accordingly slips and thereby introduces the yieldable pull necessary to accomplish a taut transfer without danger of breakage. When shaft 7 is rotated in the counterclockwise direction, spool 1 tends to wind and spool 5 tends to unwind. In this case increased tension is applied to the upper portion of belt 13 as compared to the tension for opposite rotation and greater upward force is accordingly exerted on idler 19 in opposition to spring 21. Belt 13 therefore exerts less driving action and spool 5 tends to run free of the action of this belt.

The decreased tendency of belt 13 to rotate shaft 9 when shaft 7 is rotated in the counterclockwise direction is supplemented by the action of brake 25. Thus, when belt 13 tends to rotate shaft 9 in the clockwise direction, spring 33 gives and limits the tension on belt 27. However, when belt 13 tends to rotate shaft 9 counterclockwise, belt 27 does not give and greater tension results thereon at any given angular velocity. Thus the effectiveness of belt 13 in rotating shaft 9 is decreased at the same time the retarding torque on the shaft is increased. The belt is thereby caused to slip and spool 5 caused to tend to release medium 3 at a slower rate than spool 1 tends to wind it in.

Since spool 1 is rigidly connected to shaft 7 and rotation of that shaft acomplishes transfer of medium 3 in either direction, the rate of transfer can be exactly controlled by the rotation of that shaft. Thus it is merely necessary to provide a motor or other device having the requisite speed characteristics to achieve any degree of speed control over the transfer. In the case of a magnetic recorder and reproducer, for example, a motor 35 may be connected to shaft 7, by belt 43, this motor being of the synchronous type to take advantage of the good frequency regulation of utility alternating current to maintain constant velocity thereof. In the recording operation, the constant rotational velocity of spool 1 then causes substantially constant linear velocity of medium 3 over head 37 so that the time varying magnetization thereof due to recorder and reproducer 39 (which may, for example, include a microphone and amplifier) imparts a corresponding variation in magnetization along the length of the medium. Similarly in the reproducing operation, the constant velocity of medium 3 over head 37 causes time variations in the induced voltage therein which is applied to unit 39 (which may, for example, include an amplifier and loudspeaker) to reproduce the intelligence. It should be noted that any small variations in linear velocity of medium 3 associated with the increased effective diameter of spool 1 as medium 3 is wound thereon recur in each recording or reproducing operation so that no changes in the fidelity of reproduction result therefrom.

I have found that effective operation of idler pulley assembly 17 can be achieved by using a flat biasing spring 21 having the shape shown in the figure and operating as a cantilever beam. This construction is inexpensive and has a high degree of resistance to mechanical shock and vibration. Furthermore, it is readily possible to adjust the force by biasing spring 21 by rotating anchored member 23 which may, for example, be accomplished by a mechanism such as that shown generally at 41 having locking screw 42.

The use of spring 21, together with small, light weight, idler pulley 19, provides an overall system capable of rapidly following tension variations in the belt 13. This prevents time delay between the instant a change in velocity or tension of medium 3 and the corresponding variation in the driving torque through belt 13, thereby eliminating the possibility of entanglement created by such changes.

While I have shown a particular embodiment of my invention it will be of course understood that I do not wish to be limited thereto since various modifications and alternative constructions may be made in the several elements and their arrangement. In particular, a directional brake of other construction may be substituted for brake 25 in accordance with the dictates of the particular application to which the mechanism is applied. I therefore contemplate by the appended claims to cover all such modifications and alternative constructions as fall within the true spirit and scope of my invention.

I claim as my invention:

1. A winding and reeling mechanism including a first member having a medium receiving portion and a pulley portion, a second member having a medium receiving portion and a pair of pulley portions, a medium wound about said medium receiving portions of said member for transfer therebetween by rotations thereof, a belt loosely wound about the pulley portion of said first member and one pulley portion of said second member to cause driving action therebetween, an idler pulley in operative engagement with said belt and rotatably mounted on a spring strap, means supporting said strap as a cantilever beam biasing said pulley in direction tending to tighten said belt and positioned to cause a substantial change in the direction of travel of said belt, so that rotation of the pulley portion of said one member in one direction causes greater belt forces opposing the action of said strap than rotation in the reverse direction, thus to cause said drive to exert less torque when rotating in said one direction, and a brake band wound about the other pulley portion of said second member to oppose rotation thereof, means fixedly supporting said band at one end and yieldably supporting said band at the other end, thus to cause increased braking action when said drive is rotated in said one direction so as to overcome the driving action of said drive and causing said medium to be held taut regardless of the direction of operation.

2. A winding and reeling mechanism having in combination, a first spool and a second spool, pulley and belt means connecting said spools, said means having an idler pulley resiliently biased to cause increased turning effort when said first spool is unwinding, brake means to retard said second spool when turning in the unwind direction, said last means including a pulley connected to said second spool and a brake band wound thereabout to produce retarding torque, resilient means to release said brake band when said second spool rotates in the wind direction thus causing said first means to drive said second spool in the wind direction, drive means connected to said first spool, whereby rotation of said drive means in one direction causes transfer of said medium in one direction and rotation of said drive means in the opposite direction causes reverse transfer of said medium and said medium is kept taut during all operations.

3. A winding and reeling mechanism having in combination a first spool and a second spool, a medium wound about said spools to be transferred therebetween, a pulley and belt system connecting said spools, said system having a spring biased idler adapted to tighten when said first spool is unwinding and to loosen when said first spool is winding and tending to cause said second spool to take up said medium at a greater rate than said medium is released from said first spool, a directional brake to retard said second spool when unwinding, and drive means operably connected to said first spool, whereby rotation of said first spool in one direction causes transfer of said medium in one direction and rotation of said first spool in the opposite direction causes reverse transfer of said medium.

RAYMOND E. ZENNER.

REFERENCES CITED

The following references are of record in the file of this patent:

UNITED STATES PATENTS

| Number | Name | Date |
|---|---|---|
| 1,093,933 | Jenkins | Apr. 21, 1914 |
| 1,462,604 | Lavalle | July 24, 1923 |
| 2,097,592 | Gibbs | Nov. 2, 1937 |
| 2,409,942 | Knapp | Oct. 22, 1946 |
| 2,422,143 | Somers et al. | June 10, 1947 |

FOREIGN PATENTS

| Number | Country | Date |
|---|---|---|
| 4,933 | Australia | Nov. 26, 1926 |
| 139,202 | Austria | Oct. 25, 1934 |